United States Patent
Sung et al.

(10) Patent No.: US 6,562,645 B2
(45) Date of Patent: May 13, 2003

(54) METHOD OF FABRICATING FRINGE FIELD SWITCHING MODE LIQUID CRYSTAL DISPLAY

(75) Inventors: Un Cheol Sung, Seoul (KR); Chang Yong Jeong, Seoul (KR)

(73) Assignee: Boe-Hydis Technology Co, Ltd., Kyoungki-do (KR)

( * ) Notice: Subject to any disclaimer, the term of this patent is extended or adjusted under 35 U.S.C. 154(b) by 0 days.

(21) Appl. No.: 09/894,298

(22) Filed: Jun. 28, 2001

(65) Prior Publication Data

US 2002/0001867 A1 Jan. 3, 2002

(30) Foreign Application Priority Data

Jun. 29, 2000 (KR) .......................... 2000-36489

(51) Int. Cl.[7] .......................... H01L 21/00; G02F 1/136
(52) U.S. Cl. .......................... 438/30; 438/29; 438/149; 438/151; 438/158; 438/160; 438/164; 257/57; 257/58; 257/59; 257/60
(58) Field of Search .......................... 438/30, 29, 149, 438/151, 158, 160, 164; 349/39, 43; 257/57, 58, 59, 60

(56) References Cited

U.S. PATENT DOCUMENTS

| | | | | |
|---|---|---|---|---|
| 5,185,601 A | * | 2/1993 | Takeda et al. ................. | 349/39 |
| 6,016,174 A | * | 1/2000 | Endo et al. .................... | 349/43 |
| 6,025,892 A | * | 3/2000 | Kawai et al. .................. | 349/43 |
| 6,184,945 B1 | * | 2/2001 | Sung ........................... | 349/38 |
| 6,335,211 B1 | * | 1/2002 | Lee .............................. | 438/22 |
| 2001/0035527 A1 | * | 11/2001 | Tanaka et al. ................. | 257/59 |
| 2001/0050368 A1 | * | 12/2001 | Moon ........................... | 257/72 |
| 2003/0008436 A1 | * | 1/2003 | Tanaka et al. ............... | 438/149 |

* cited by examiner

Primary Examiner—Michael S. Lebentritt
Assistant Examiner—Michael K. Luhrs
(74) Attorney, Agent, or Firm—Ladas & Parry

(57) ABSTRACT

Disclosed is a method of fabricating fringe field switching mode liquid crystal display by forming a gate bus line and a common electrode line on a lower substrate in parallel with each other; forming a gate insulating layer on the lower substrate; forming a counter electrode on the gate insulating layer to overlap with a predetermined part of the common electrode line; depositing a metal layer on the resulting lower substrate and then selectively patterning the metal layer, thereby forming a contacting part connecting the counter electrode to the exposed common electrode line; depositing a protective layer on the lower substrate obtained after formation of the source, the drain and the contacting part; selectively etching the protective layer to expose a predetermined part of the drain; and forming a pixel electrode on the protective layer to form a field with the counter electrode, being in contact with the drain.

8 Claims, 5 Drawing Sheets

METHOD OF FABRICATING FRINGE FIELD SWITCHING MODE LIQUID CRYSTAL DISPLAY

BACKGROUND OF THE INVENTION

1. Field of the Invention

The present invention relates to a method of fabricating fringe field switching mode liquid crystal display (hereinafter referred to as FFS-LCD), and more particularly to a fabrication method of FFS-LCD capable of preventing shorts between a gate bus line and a common electrode line.

It is well known that a FFS-LCD has been proposed in order to improve a low aperture ratio and a transmittance of IPS (In Plane Field Switching)-LCD.

In the FFS-LCD, a counter electrode and a pixel electrode are made of transparent conductors and the distance between the electrodes is narrower than that of an upper and a lower substrates to form a fringe field on the electrodes and thereby, drive all of liquid crystal molecules thereon.

A conventional method of fabricating FFS-LCD will be described in conjunction with FIGS. 1 and 2.

FIG. 1 is a cross-sectional view for showing a conventional method of fabricating FFS-LCD and FIG. 2 is a layout thereof.

Referring to FIG. 1, an ITO layer is first deposited on a lower substrate 11 and then selectively patterned to form a counter electrode 12.

Subsequently, a metal layer (not shown) is deposited on the lower substrate 11 having the counter electrode 12 thereon, to a predetermined thickness and then selectively patterned to form a gate bus line 13, a gate electrode 13a extended from the gate bus line 13 and a common electrode line 130.

Here, the common electrode line 130 is in contact with a predetermined part of the counter electrode 12, being in parallel with the gate bus line 13.

After formation of the gate bus line 13 and the common electrode line 130, a gate insulating layer 14, an amorphous silicon layer for channel and a doped semiconductor layer are sequentially deposited on the lower substrate 11.

The amorphous silicon layer for channel and the doped semiconductor layer are then selectively patterned in order to form a thin film transistor region, thereby forming a channel layer 15 and an ohmic layer 16.

And then, a metal layer (not shown) is deposited on the surface of resulting structure and selectively patterned to overlap with both sides of the channel layer 15 and a part of the gate bus line 13, thereby forming a source 17a, a drain 17b and a data bus line 17.

Thereafter, a protective layer 18 is deposited on the resulting lower substrate 11 and selectively etched to expose the drain 17b. Then, a pixel electrode 19 is formed on the protective layer 18 in a slant shape, being in contact with the exposed drain 17b.

In this FFS-LCD, a fringe field is formed between a slant part of the pixel electrode 19 and counter electrode 12 exposed by the slant part, thereby driving all of the liquid crystal molecules on the pixel electrode 19 and the counter electrode 12.

However, a conventional FFS-LCD has several problems since a gate bus line 13, a common electrode line 120 and a counter electrode 12 are formed on the same plane.

However, a conventional FFS-LCD has several problems since a gate bus line 12, a common electrode line 120 and a counter electrode 13 are formed on the same plane.

Therefore, a method has been proposed in that the counter electrode 12 is formed by depositing an ITO layer on the lower substrate 11 and then a metal layer is deposited thereon and selectively patterned to form the gate bus line 13 and the common electrode line 130.

However, the ITO layer is generally etched by a wet-etching process and the etching property is very poor. Therefore, the ITO layer remains to some extent after etching process for forming the counter electrode 12.

This residues of ITO layer 120 may be formed wherever on the lower substrate 11 and operates as a bridge between the gate bus line 13 and the common electrode line 130.

As a result, shorts are generated between the gate bus line 13 and the common electrode line 130 by the residues of ITO layer 120, thereby decreasing yield of FFS-LCD.

SUMMARY OF THE INVENTION

Therefore, the present invention has been made to solve the above problems. The object of the present invention is to provide a method of fabricating FFS-LCD capable of preventing shorts between a gate bus line and a common electrode line.

In order to achieve the above object, the present invention comprises the steps of: forming a gate bus line and a common electrode line on a lower substrate in parallel with each other; forming a gate insulating layer on the lower substrate; forming a counter electrode on the gate insulating layer to overlap with a predetermined part of the common electrode line; depositing a metal layer on the resulting lower substrate and then selectively patterning the layer, thereby forming a contacting part connecting the counter electrode and the exposed common electrode line; depositing a protective layer on the lower substrate obtained after formation of the source/drain and the contacting part; selectively etching the protective layer to expose a predetermined part of the drain; and forming a pixel electrode on the protective layer to form a field with the counter electrode, being in contact with the drain.

BRIEF DESCRIPTION OF THE INVENTIONS

DETAILED DESCRIPTION OF THE PREFERRED EMBODIMENTS

The preferred embodiment of the present invention will be described in detail with reference to accompanying drawings.

Figure 5:
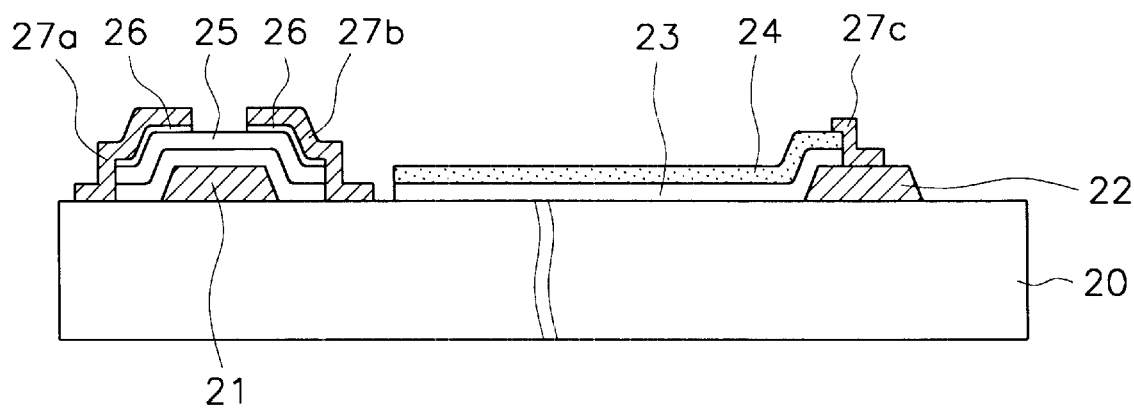
Figure 6:
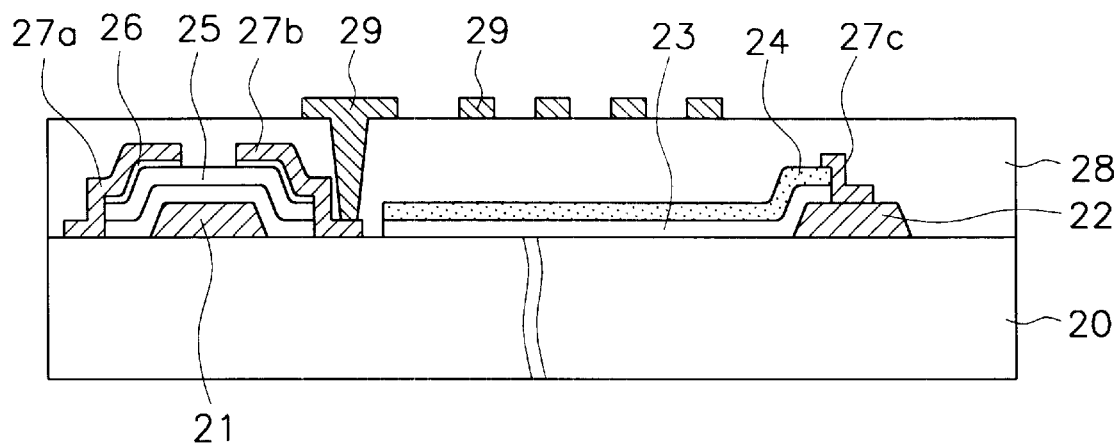
Figure 7:
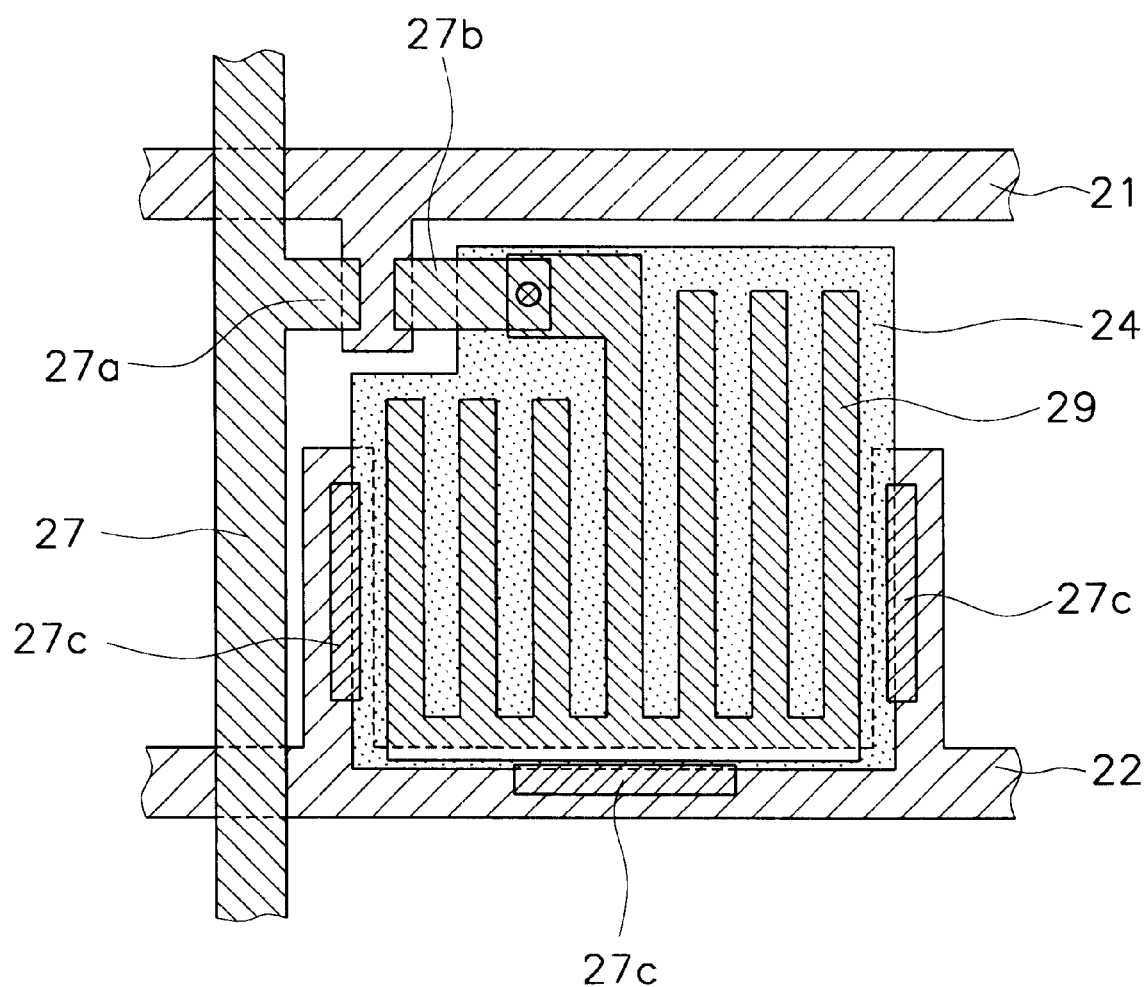
FIG. 7 is a layout of FFS-LCD according to the present invention.

FIGS. 3 to 6 are cross-sectional views of manufacturing processes of FFS-LCD according to the present invention and FIG. 7 is a layout of FFS-LCD of the present invention.

Figure 1:
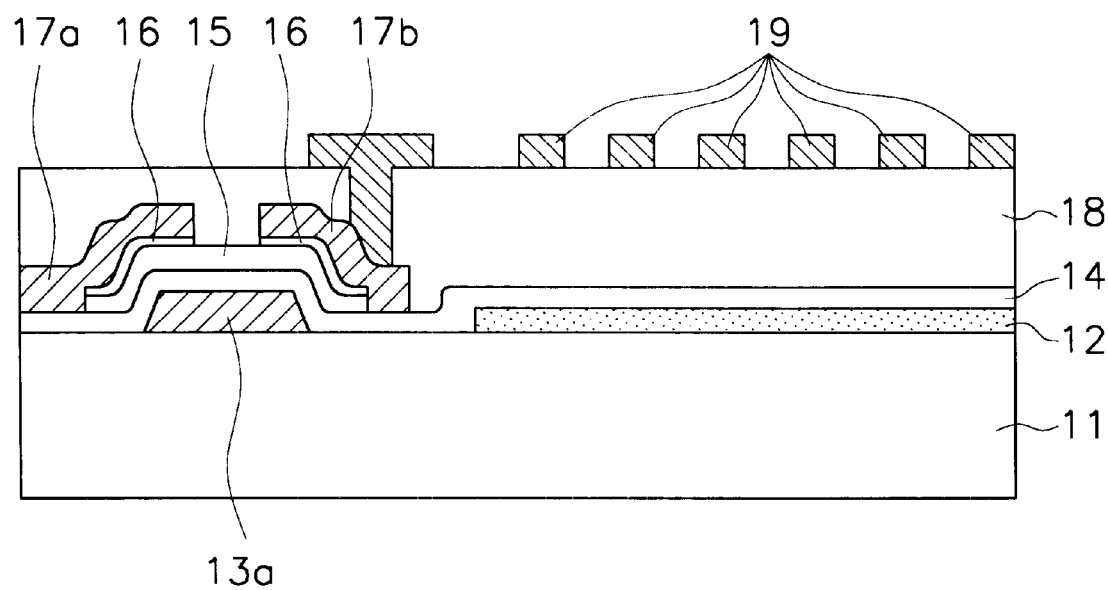
FIG. 1 is a cross-sectional view of FFS-LCD according to a conventional method.
Figure 2:
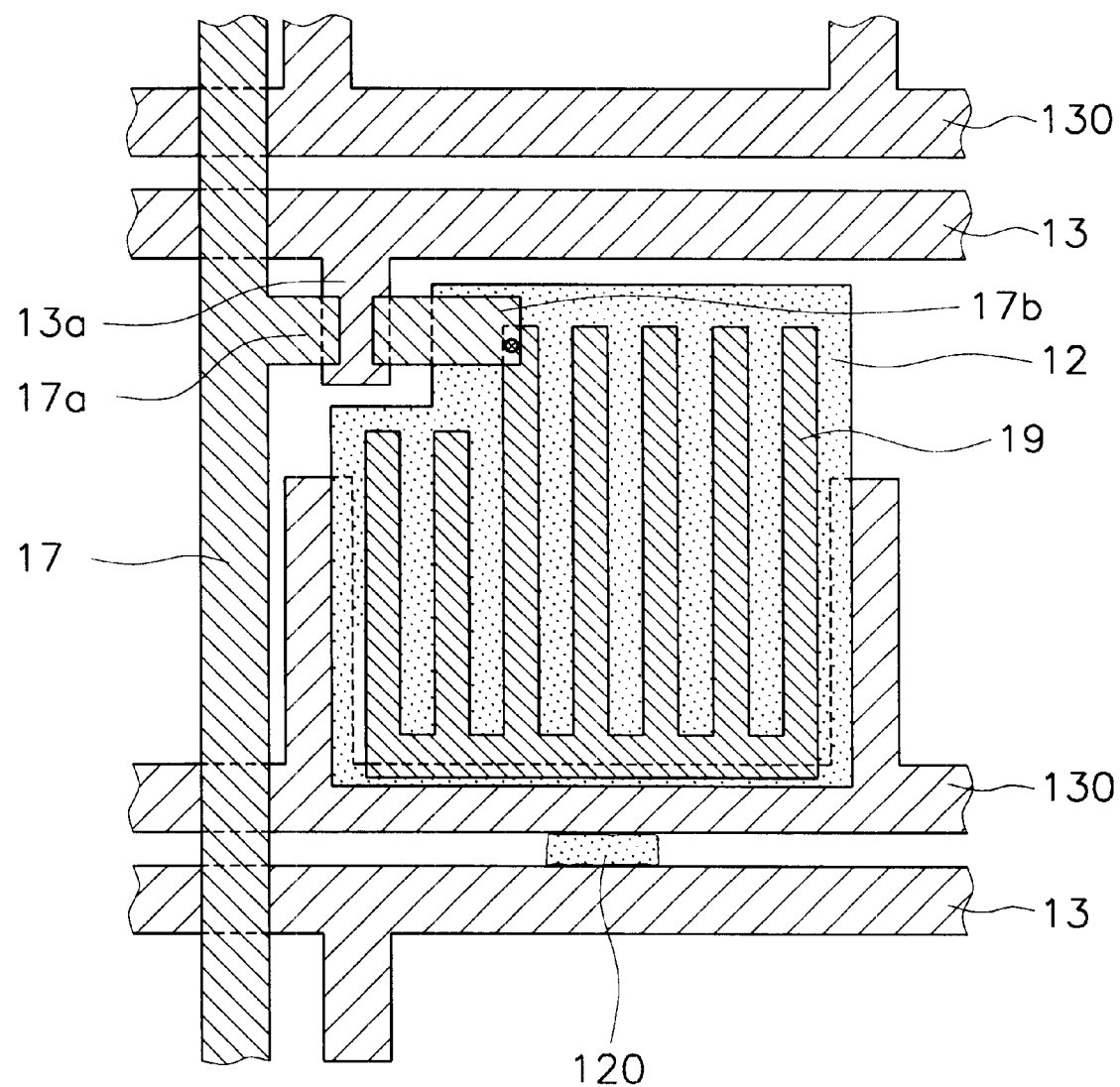
FIG. 2 is a layout of FFS-LCD according to a conventional method.
Figure 3:
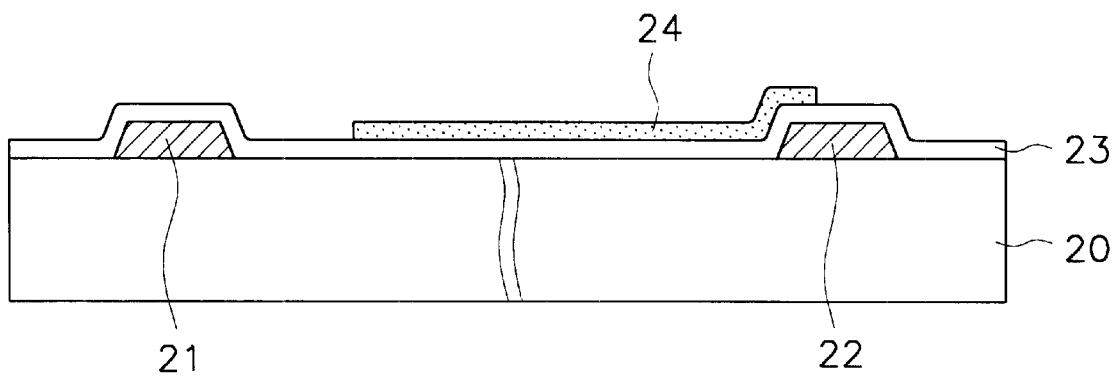
FIGS. 3 to 6 are cross-sectional views of manufacturing processes of FFS-LCD according to the pre sent invention.

Referring to FIG. 3, a metal layer is deposited on a lower substrate 20 and then selectively patterned to form a gate bus line 21 and a common electrode line 22.

And, a gate insulating layer 23 is formed on the lower substrate 20 obtained after formation of the gate bus line 21 and the common electrode line 22.

A transparent conductor, such as ITO layer, is then deposited on the gate insulating layer 23 at a predetermined thickness.

Subsequently, a counter electrode 24 is formed by selectively patterning the ITO layer with separation from the gate bus line 21 at a predetermined distance and overlapping with a predetermined part of the common electrode line 22.

Figure 4:
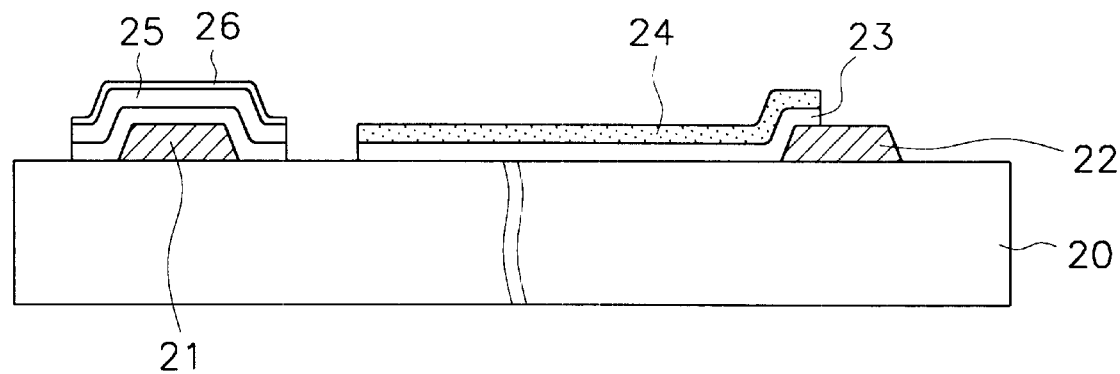

Referring to FIG. 4, an amorphous silicon layer for channel and a semiconductor layer doped with impurities are sequentially formed on the gate insulating layer 23 obtained after formation of the counter electrode 24.

And then, the semiconductor layer and the amorphous silicon layer are selectively patterned so that a predetermined part is left over on the gate bus line 21, thereby forming an ohmic layer 26 and a channel layer 25.

Subsequently, the gate insulating layer 23 is selectively patterned by using the ohmic layer 26, the channel layer 25 and the counter electrode 24 as masks to expose surfaces of the lower substrate 20 and common electrode line 22.

Referring to FIG. 5, a metal layer (not shown) for providing a data bus line is deposited on the lower substrate 20 obtained after the processes of FIG. 4.

Then, the metal layer (not shown) is selectively patterned to be in contact with upper parts of the ohmic layer 26 to expose the channel layer 25 and sides of counter electrode 24, thereby forming a source 27a, a drain 27b and a contacting part 27c to electrically connect the counter electrode 24 to the common electrode line 22.

Referring to FIGS. 6 and 7, a protective layer 28 is deposited on the lower substrate 20 obtained after formation of the source 27a, the drain 27b and the contacting part 27c.

Subsequently, the protective layer 28 is selectively etched to expose the drain 27b and then an ITO layer (not shown) is deposited on the protective layer 28 to be in contact with the exposed drain 27b. And, the ITO layer (not shown) is patterned in a slant shape to overlap with the counter electrode 24, thereby forming a pixel electrode 29.

As described above, the gate bus line 21 and the common electrode line 22 are formed on the surface of lower substrate 20 and the counter electrode 24 is formed on the upper part of lower substrate 20 having the gate bus line 21 and common electrode line 22 thereon, and the gate insulating layer 23 is interposed between them.

Therefore, shorts are prevented between the gate bus line 21 and the common electrode line 22 even though etching residues remain in forming the counter electrode 24, since the counter electrode 24 is formed on the surface different from that of the gate bus line 21 and the common electrode line 22.

Moreover, although the counter electrode 24 is formed on the gate insulating layer 23 and the contacting part 27c to connect the counter electrode 24 and the common electrode line 22 is separately formed, there are no additional processes since the contacting part 27c is formed at the same time of forming the source 27a and the drain 27b.

The present invention is not limited to the preferred embodiment, FFS-LCD, and it is applicable to any mode that a counter electrode and a pixel electrode are formed on the same substrate.

As described above, according to the present invention, the gate bus line and the common electrode line are formed on the lower substrate and the gate insulating layer is formed thereon, and then the counter electrode is formed on the gate insulating layer. Therefore, etching residues generated from patterning the ITO layer to form the counter electrode are not directly in contact with the gate bus line and the common electrode line, thereby preventing shorts between the gate bus line and the common electrode line.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed:

1. A method of fabricating FFS-LCD comprising the steps of:
    forming a gate bus line and a common electrode line on a lower substrate in parallel with each other;
    forming a gate insulating layer on the lower substrate;
    forming a counter electrode on the gate insulating layer to overlap with a predetermined part of the common electrode line;
    depositing a metal layer on the resulting lower substrate and then selectively patterning the metal layer, thereby forming a source region, a drain region and a contacting part connecting the counter electrode to the exposed common electrode line;
    depositing a protective layer on the lower substrate obtained after formation of the source, the drain and the contacting part;
    selectively etching the protective layer to expose a predetermined part of the drain; and
    forming a pixel electrode on the protective layer to form a field with the counter electrode, the pixel electrode being in contact with the drain.

2. A method of fabricating FFS-LCD according to claim 1, wherein the counter electrode is a transparent conductor including an ITO.

3. A method of fabricating FFS-LCD according to claim 1, wherein the contacting part connects the counter electrode to the common electrode, overlapping with the common electrode line.

4. A method of fabricating FFS-LCD according to claim 1, further comprising the steps of:
    before the step of depositing the metal layer,
    forming a channel layer and an ohmic layer on the gate insulating layer to cover a predetermined part of the gate bus line;
    exposing predetermined parts of the lower substrate and the common electrode line by selectively etching the gate insulating layer to accommodate the shape of the ohmic layer, the channel layer and the counter electrode; and
    depositing the metal layer on the resulting structure and then selectively patterning a predetermined part of the metal layer to form a source and a drain adjacent either side of the ohmic layer.

5. A method of fabricating FFS-LCD according to claim 4, wherein a contacting part to connect the counter electrode and the exposed common electrode line is formed by selectively patterning a predetermined part of the metal layer at the same time of forming the source and the drain.

6. A method of fabricating FFS-LCD comprising the steps of:
    forming a gate bus line and a common electrode line on a lower substrate in parallel with each other;
    forming a gate insulating layer on the lower substrate obtained after formation of the gate bus line and the common electrode line;
    forming a counter electrode on the gate insulating layer to overlap with a predetermined part of the common electrode line;

forming a channel layer and an ohmic layer to cover a predetermined part of the gate bus line;

exposing predetermined parts of the lower substrate and the common electrode line by selectively etching a predetermined part of the gate insulating layer in a shape of the ohmic layer, the channel layer and the counter electrode;

depositing a metal layer on the resulting lower substrate and then selectively patterning, thereby forming a source and a drain at both sides of the ohmic layer and forming a contacting part to connect the counter electrode and the exposed common electrode line;

depositing a protective layer on the lower substrate obtained after formation of the source/drain and the contacting part;

selectively etching the protective layer to expose a predetermined part of the drain; and forming a pixel electrode on the protective layer to form a field with the counter electrode, being in contact with the drain.

7. A method of fabricating FFS-LCD according to claim 6, wherein the counter electrode is a transparent conductor including an ITO.

8. A method of fabricating FFS-LCD according to claim 6, wherein the contacting part connects the counter electrode and the common electrode, overlapping with the common electrode line.

* * * * *